United States Patent [19]

Zweigle et al.

[11] 4,059,552

[45] Nov. 22, 1977

[54] CROSS-LINKED WATER-SWELLABLE POLYMER PARTICLES

[75] Inventors: Maurice L. Zweigle; Jack C. Lamphere, both of Midland, Mich.

[73] Assignee: The Dow Chemical Company, Midland, Mich.

[21] Appl. No.: 625,297

[22] Filed: Oct. 23, 1975

Related U.S. Application Data

[63] Continuation-in-part of Ser. No. 481,598, June 21, 1974, abandoned.

[51] Int. Cl.$^2$ .................. C08L 33/02; C08L 33/26; C08L 41/00
[52] U.S. Cl. .................. 260/29.6 TA; 128/284; 252/8.55 R; 260/29.6 H; 260/29.6 PM; 260/29.6 RW; 260/72 R; 260/79.3 MU; 526/81; 526/201; 526/207; 526/303; 526/306
[58] Field of Search .................. 260/29.6 TA, 29.6 H, 260/29.6 PM

[56] References Cited

U.S. PATENT DOCUMENTS

| | | | |
|---|---|---|---|
| 2,205,355 | 6/1940 | Grimm et al. | 149/6 |
| 2,982,749 | 5/1961 | Friedrich et al. | 260/23 |
| 3,104,231 | 9/1963 | Fitch | 260/29.7 |
| 3,247,171 | 4/1966 | Walker et al. | 260/80.3 |
| 3,252,904 | 5/1966 | Carpenter | 252/8.55 |
| 3,284,393 | 11/1966 | Vanderhof et al. | 260/29.6 |
| 3,539,535 | 11/1970 | Wisner | 260/72 |
| Re. 26,934 | 8/1970 | Mosbach | 260/29.6 |

*Primary Examiner*—Stanford M. Levin
*Attorney, Agent, or Firm*—Michael S. Jenkins

[57] ABSTRACT

Cross-linked water-swellable polymers are described, having a particle size of less than 4 microns. They are used as thickening agents for aqueous dispersions or solutions, particularly useful where high shear conditions are encountered in the application.

15 Claims, No Drawings

CROSS-LINKED WATER-SWELLABLE POLYMER PARTICLES

CROSS REFERENCE TO RELATED APPLICATION

This is a continuation-in-part of our copending application, Ser. No. 481,598, filed June 21, 1974, now abandoned.

BACKGROUND

The present invention relates to improved water-swellable, cross-linked polymers and an improved method of thickening aqueous media therewith.

Techniques have been disclosed whereby high molecular weight linear polymers have been made utilizing a water-in-oil emulsion polymerization process in which a water-soluble monomer is emulsified in an oil phase and polymerized therein. Such a process is revealed in U.S. Pat. No. 3,284,393. Inverse suspension polymerization of water-soluble unsaturated monomers is taught in U.S. Pat. No. 2,982,749 wherein linear polymer beads ranging in size between 10 microns and 2 millimeters in diameter are formed. The polymeric products of these processes have been found to be useful as binders in coating compositions, and as flocculating, suspending or thickening agents.

These processes produce linear polymers which have virtually no gel strength. Gel strength refers to that property of the water-swollen polymers which resists viscosity change as the result of mechanical working or milling.

U.S. Pat. No. 3,247,171 reveals a process which produces a water-swellable polymer with high gel capacity obtained by the use of controlled cross-linking and hydrolysis. This process produces bulk gel polymer through the use of bulk solution polymerization. The resulting polymer may be dried and ground to a fine powder. However, the particles of polymer so prepared are still of substantial size so that aqueous slurries prepared therefrom are shear sensitive. Consequently in applications such as paper coating where the use of rolls and doctor blades produces a shear of from 100,000 to 200,000 reciprocal seconds, the polymer particles are degraded and thereby lose much of their thickening and water-holding properties. Similarly, where colloid mills are used such as in the making of paints, the linear polymers made according to the first two mentioned patents and the polymer particles of the last mentioned patent must be added to the paint after the step employing the colloid mills or degradation of the polymers will occur.

STATEMENT OF THE INVENTION

It has now been discovered that by utilizing water-in-oil emulsion or suspension polymerization processes, cross-linked, water-insoluble but highly water-swellable polymer particles of less than 4 microns in size can be made. These novel high-molecular-weight polymer particles although highly water-swellable have no appreciable solubility in water and are substantially insensitive to mechanical shearing in aqueous media. Consequently such polymer particles can be used for a variety of applications where high mechanical working or milling is required. Unlike high molecular weight polymers currently available which thicken well but also give solutions which are stringy, the polymer particles of this invention are effective thickening agents which do not exhibit this problem. These particles when swollen in the solvent to be thickened, exhibit pseudoplastic rheology and "short" solution characteristics. By "short" solution characteristics is meant that the solution or micro-suspension does not produce threads or strings of such aqueous medium when two surfaces wetted with the medium are contacted and then pulled apart.

A novel process involving water-in-oil suspension polymerization of water-soluble monomers with the use of cross-linking agents and controlled homogenization is hereinafter described for producing the novel polymer particles. A novel process involving water-in-oil emulsion polymerization of water-soluble monomers with the use of cross-linking agents similarly produces the novel particles. Because of the uniform small particle size and high gel capacity of the cross-linked product the latter is particularly suited for uses where rapid sorption of aqueous fluid is desired, for example in sanitary articles such as diapers, bed pads and the like, or for uses where the swelling properties in water are employed, for example, in the plugging of finely porous, permeable formations in the soil or in subterranean strata.

GENERAL DESCRIPTION

The water-soluble ethylenically unsaturated monomers which ca be polymerized by the polymerization processes of this invention are well known. Such monomers, which readily undergo vinyl polymerization, include acrylamide, methacrylamide, acrylic acid, methacrylic acid, vinylbenzyl-trimethylammonium chloride, alkali metal and ammonium salts of 2-sulfoethyl-acrylate, 2-aminoethyl methacrylate hydrochloride, alkali metal and ammonium salts of vinylbenzene sulfinate, and the like.

SUSPENSION METHOD

When the suspension route is used to make the polymer particles, aqueous solutions of the monomers to be polymerized can be varied widely in monomer content, i.e., from about 5 to 80 weight percent of monomer in water, depending upon the monomer and the polymerization temperature. The ratio of aqeous monomer phase to oil phase is also widely variable, advantageously from about 5 to 75 weight parts of aqueous phase to correspndingly 95 to 25 parts of oil phase.

The suspending agent is a solid or liquid substance having a low hydrophile-lyophile balance i.e., being preponderantly hydrophobic. Suspending agents suitable for use are described in U.S. Pat. No. 2,982,749. A preferred suspending agent is an organic polymer which, while predominantly hydrophobic, has hydrophilic substituents such as amine, sulfone, sulfonate, carboxy, and the like, groups. The suspending agent should be employed in an amount sufficient to assure the desired degree of subdivision of the aqueous monomer phase, usually from about 0.4 to about 1 percent by weight, based on the weight of said aqueous phase.

The oil phase can be any inert hydrophobic liquid which does not take part in the polymerization reaction and can be separated readily from the polymeric product. Of such liquids the hyrocarbons and chlorinated hydrocarbons such as toluene, xylene, o-dichlorobenzene, ethylbenzene, monochlorobenzene, propylene dichloride, carbon tetrachloride, 1,1,1,trichoroethane,, tetrachloroethylene, methylene chloride etc., are advantageously used. Toluene, xylene, and chlorinated hydrocarbons are preferred as oil phase liquids.

Organic compounds having two ethylenic groups copolymerizable with the water-soluble monomers can be used as the cross-linking agents. Exemplary cross-linkers include divinylbenzenesulfonate, ethyleneglycol diacrylate, ethylene glycol dimethacrylate, propylene glycol diacrylate, allyl acrylate, diallyl ethylene glycol ether, divinyl ether, diallyl ether, divinyl ether of ethylene glycol, divinyl ether of diethylene glycol, divinyl ether of triethylene glycol, and the like difunctional organic monomers containing two $CH_2=C<$ groupings which organic materials are soluble to the extent of at least about 0.05% in the aqueous monomer solutions. Preferred cross-linking agents are N,N'-methylene-bis-acryamide, N,N'-methylene-bis-methacrylamide and other lower alkylidene-bis-acrylamides wherein the alkylidene group has up to 4 carbons. It is among the advantages of the invention that only very small amounts of cross-linking agents are required to produce the desired water-insoluble but highly water-swellable polymeric microbeads. Good results have ben obtained when employing from about 50 to 1000 parts, preferably from about 100 to 400 parts, by weight of cross-linker per million parts of vinyl monomer in the polymerization recipe.

Polymerization initiators including peroxide catalysts such as t-butyl hydroperoxide and dimethane sulfonyl peroxide and redox systems such as t-butyl hydroperoxide or alkali metal or ammonium persulfates in combination with usual reducing agents such as a sulfite or bisulfite can be used in the practice of this invention. Alternatively free radicals can be generated in situ by ultraviolet or X-rays.

In practice, the water-in-oil suspending agent is dissolved in the oil phase and an aqueous solution of monomer or mixed monomers with a cross-linker and with or without added polymerization initiator is then mixed with the oil phase and then sheared with vigorous agitation through the use of a Waring Blendor, homogenizer, colloid mill or other means to disperse the aqueous phase thoroughly as micro-droplets in the oil phase. An advantageous method is to homogenize the mixture thoroughly before beginning polymerization. This is done by the use of a homogenizer which is set at a certain pressure setting and hereby obtains a shear that will determine the particle size. A Manton-Gaulin Laboratory Homogenizer which is a single plunger positive displacement unit can be employed for this purpose. Homogenization is accomplished by forcing the mixture of liquids through an adjustable valve orifice under pressure in such a manner as to apply very high shear to the two phase mixture. In the present system, the water solution of monomer is sheared into very small droplets dispersed in the continuous hydrocarbon phase. Other commercial homogenizers or shearing colloid mills can likewise be employed. This shearing agitation is applied until the aqueous solution is suspended in the oil phase as globules ranging between about 1 micron and about 50 microns in diameter. The stirred mixture is purged with nitrogen or other inert gas and the reaction temperature is then raised to between 30° and 80° C. as desired, preferably with continued vigorous agitation to prevent separation of phases or adhesion of polymer beads. Polymerization is initiated by an added free radical generator such as a peroxide catalyst or by ultraviolet or x-radiation as indicated. The order of addition of reaction media ingredients is not important. Th reaction is continued, generally with good agitation, until conversion is substantialy complete. Polymeric beads are thereby formed, which are separated from the reaction medium, washed and dried.

If a cationic product is desired, the polymer, prior to removal from solution, can be modified by reaction with formaldehyde and amines to produce cationic polymers in the manner disclosed in U.S. Pat. No. 3,539,535, or it can be produced by copolymerization of cationic comonomer with acrylamide.

The products, upon being uniformly dispersed in water, quickly thicken the water to give a viscous, "short" pseudoplastic dispersion.

SPECIFIC EMBODIMENTS

The following examples show ways in which the invention has been practiced using the suspension method.

EXAMPLE 1

Crosslinked Acrylamide-Sodium Acrylate Copolymer 168 grams of acrylamide, 42 grams of acrylic acid, 63 grams of $Na_2CO_3$, 0.21 gram of pentasodium (carboxymethylimino)bis(ethylene-nitrilo)tetraacetic acid (Versenex 80), 0.042 gram of methylene-bisacrylamide, 0.105 gram of sodium metabisulfite and 0.105 gram of tertiary butyl hydroperoxide are dissolved in 1050 grams of deionized water and sufficient sodium hydroxide added thereto to bring the mixture to a pH of 9.5. The resulting solution is mixed with an oil phase consisting of 31.5 grams of acrylic acid and 6.3 grams of a suspending agent, consisting of a chloromethylated polystyrene-dimethylamine reaction product wherein about 5–10 percent of th aromatic rings are aminated, dissolved in 1575 milliliters of xylene. The resulting mixture is sheared at high speed in a Waring Blender for two minutes, placed in an agitated reactor and purged with nitrogen. The temperature of the reaction vessel and contents is raised to 63° C. over a period of one hour and thereafter held at about 52° C for an additional 2.5 hours to complete the polymerization raction. A portion of the resulting slurry is then dewatered by azeotropic distillation and the resulting suspension filtered to separate the copolymer in the form of microbeads. The latter were washed with acetone and dried. The sorptive power of the beads to swell in aqueou fluid was measured and it was found that the copolymer held 82 grams of aqueous 0.27 molar sodium chloride solution per gram of copolymer. To a further 55 gram portion of the above copolymer slurry were added 27.7 milliliters of dimethylamine and then 14.8 grams of paraformaldehyde slurried in a little xylene. The resulting mixture was heated to 40° C. for 1.5 hours, filtered, and dried by acetone extraction to give cationic, crosslinked polyacrylamide microbeads, ranging in size between 0.2 and 4 microns in diameter. The product absorbed 50 grams of aqueous 0.27M NaCl solution per gram of product. The grams of aqueous fluid absorbed and held by one gram of dry polymer beads is hereinafter referred to as the "gel capacity" of the polymer. The product upon being uniformly dispersed in water, quickly thickened the water to give a viscous, "short," pseudo-plastic dispersion.

In the above and succeeding recipes "Versenex 80" is a trademark of The Dow Chemical Company for a chelating agent in which the active chelant is pentasodium (carboxymethylimino)bis(ethylenenitrilo)tetracetic acid. Also the expression "ppm BOM" is hereafter employed to denote parts per million based on monomers, that is, parts by weight of the indicated ingredient per million parts by weight of water-soluble, ethylenically unsaturated monomers in the recipe. Hereinafter tertiary-butyl hydroperoxide will be abbreviated "t-BHP."

EXAMPLE 2

Cross-linked polyacrylamide Microbead

Recipe:

| Water Phase | |
| --- | --- |
| Acrylamide | 210 g. |
| Methylene bis acrylamide | .042 g. |
| Versenex 80 Chelant | 1000 ppm BOM |
| NaOH to pH 11.5 | |
| Water | 840 g. |
| $Na_2S_2O_8$ | 500 ppm BOM |
| t-BHP | 500 ppm BOM |
| Oil Phase | |
| Xylene | 1575 ml. |
| Aminated Chloromethylated Polystyrene | 6.3 g. |
| Methanol | 20 ml. |

The process was similar to that of the previous example. The product was dewatered by azeotropic distillation, separated by filtration, washed with acetone and dried. It was found to have a gel capacity of 30 in aqueous 0.27M NaCl solution.

EXAMPLE 3

Cross-linked Partially Hydrolyzed Polyacrylamide Microbead

Recipe:

| Water Phase | |
| --- | --- |
| Acrylamide | 106 g. |
| Methylene bis acrylamide | .025 g. |
| Water | 463 g. |
| $Na_2CO_3$ | 61.3 g. |
| Versenex 80 Chelant | 1000 ppm BOM |
| $Na_2S_2O_8$ | 500 ppm BOM |
| t-BHP | 500 ppm BOM |
| Oil Phase | |
| Xylene | 945 ml. |
| Suspending Agent of Ex. 2 | 3.78 g. |
| Acrylic acid | 20 g. |

The process was similar to that of the previous examples. The product exhibited similar properties and had a gel capacity of 75 in aqueous 0.27M NaCl solution.

Emulsion Method

When the emulsion route is used to make the novel polymer particles, the ratio of monomer phase (liquid monomer or aqueous solution of monomer) to oil phase, the emulsifying agents, the oil phase, the initiators, temperatures and pressures are all generally found in U.S. Pat. No. 3,284,393. The cross-linking agents described above in connection with the suspension method can be similarly advantageously used herein.

The practice, the water-in-oil emulsifying agent is dissolved in the oil phase, while the free radical initiator, when one is use, is dissolved in the oil or monomer phase, depending upon whether an oil- or water-soluble initiator is used. An aqueous solution of monomer or mixed monomers or a monomer per se is then added to the oil phase along with the cross-linking agent with agitation until the monomer phase is emulsified in the oil phase. The reaction is initiated by purging the reaction medium of inhibitory oxygen and continued with agitation until conversion is substantially complete. A polymeric latex is thereby obtained. The polymer is separated from the reaction medium advantageously by adding a flocculating agent and filtering, and is then washed and dried. Alternatively, the latex reaction product can be used as such.

Specific Embodiments
Example of emulsion technique:

| Ingredients | Amount |
| --- | --- |
| Aqueous Phase | |
| Acrylamide | 525 g. |
| Acrylic acid | 225 g. |
| NaOH | 120 g. |
| Deionized water | 695 g. |
| Methylene bis acrylamide | 0.150 g. |
| Versenex 80 | 1000 ppm BOM |
| t-BHP | 350 ppm BOM |
| $Na_2S_2O_5$ | 700 ppm BOM |
| Oil Phase | |
| De-odorized kerosene | 1500 g. |
| Di-stearyl dimethyl ammonium chloride (Arquad 2HT-100) | 75 g. |

The water phase, less t-BHP and $Na_2S_2O_5$, was mixed with the oil phase and homogenized in a Manton-Gaulin homogenizer, placed in the reactor, and purged for 45 minutes with nitrogen. t-BHP and $Na_2S_2O_5$, both as 1.5% aqueous solutions, were added portion-wise, a third of the total at a time, resulting in polymerization. The product was azeotropically distilled at 40 mm pressure from 40° to 110° C. to remove water and give a product having particles size less than two microns. The microbead polymeric product thickened water instantly on being dispersed in water.

In using the cross-linked microbeads as thickening agents, it is generally desirable to assure that the microbeads are rapidly and thoroughly dispersed throughout the aqueous medium in which thickening is desired. Thus, for example, in employing solid microbeads to thicken a styrene-butadiene copolymer latex for use in a paper-coating composition it has been found that direct introduction of the dry, solid microbeads into the latex may cause lumping or even coagulation. In practice it is desirable to dilute the microbeads in an inert medium before mixing them with a latex. For example, the microbeads can be thoroughly mixed with the finely divided mineral pigment, such as calcium carbonate or titanium dioxide, employed in such coating compositions and the resulting mixture be rapidly dispersed in the latex. Alternatively, the microbeads may be dispersed in a water-miscible liquid in which the beads are not swelled appreciably and then be rapidly dispersed in the aqueous medium to be thickened. For example, microbeads prepared as in Example 1 are moistened with methanol and dispersed in tripropylene glycol to produce a surry containing 30 percent by weight of microbeads. Sufficient of this slurry is dispersed in a latex composition based on a styrene-butadiene-itaconic acid copolymer to provide one percent by weight of microbeads in the finished composition and to produce a composition having a viscosity of about 6000 centipoises and suitable for use as a carpet backing. Good thickening results have been obtained using from about 0.1 to about 2.0 percent by weight of the microbeads in various aqueous media.

It should be noted that the gel capacity of the water-swellable microbeads varies with the ionic strength of the aqueous medium to be thickened. Thus, a given preparation of the beads may sorb 5 to 10 times as much deionized water as they will in a salt solution. The preferred microbeads have gel capacities of at least 10, preferably at least 20, grams per gram in aqueous 0.27M sodium chloride solution.

In a representative operation a carpet backsizing composition is prepared by thoroughly blending 350 parts of finely ground calcium carbonate with 293 parts of a styrene-butadiene copolymer latex containing 100 parts of latex solids. One part by weight of the microbeads of the initial preparation of Example 1 is mixed with the last 150 parts of the calcium carbonate before the latter is blended into the composition with vigorous stirring. The viscosity of the composition begins to build almost immediately when the microbeads are incorporated and on completion of the mixing the composition is found to have a viscosity of about 6000 centipoises as measured with a Brookfield viscometer using the No. 5 spindle at 20 rpm. When subjected to shear of up to 1320 reciprocal seconds in a Rotovisko rotational viscometer, the composition shows very low hysteresis and substantially 100 percent recovery of viscosity when shearing is discontinued.

We claim:

1. A method for thickening an aqueous medium to obtain a composition having the properties of a viscous short solution and being resistant to viscosity degradation under conditions of high shear which comprises the step of thoroughly dispersing in said medium from about 0.1 to about 2 percent by weight of microbeads of a water-insoluble, water-swellable polymer of a water-soluble vinyl monomer or mixture of water-soluble vinyl monomers, cross-linked with a difunctional cross-linking agent copolymerizable with said monomer or monomers, said microbeads having diameters of from about 0.2 to about 4 microns and having a gel capacity of at least about 10 grams per gram in aqueous 0.27 molar sodium chloride solution, said cross-linking agent being present in an amount from about 50 to 1000 parts by weight of cross-linking agent per million parts of vinyl monomer or monomers in the polymer.

2. A method according to claim 1 wherein the polymer is cross-linked with from about 100 to 400 parts by weight of cross-linking agent per million parts of vinyl monomer or monomers in the polymer.

3. A method according to claim 2 wherein the vinyl monomer is acrylamide.

4. A method according to claim 2 wherein the polymer is a copolymer of acrylamide and acrylic acid with the cross-linking agent.

5. A method according to claim 2 wherein the polymer is a copolymer of acrylamide and sodium acrylate with the cross-linking agent.

6. The method of claim 1 wherein the cross-linking agent is divinylbenzenesulfonate, ethyleneglycol diacrylate, ethylene glycol dimethacrylate, propylene glycol diacrylate, allyl acrylae, diallyl ethylene glycol ether, divinyl ether, dially ether, divinyl ether of ethylene glycol, divinyl ether of diethylene glycol, divinyl ether of triethylene glycol, N,N'-methylene-bis-acrylamide, N,N'-methylene-bis-methacrylamide and other lower alkylidene-bis-acrylamides wherein the alkylidene group has up to 4 carbons.

7. The method of claim 1 wherein the vinyl monomer is proponderantly acrylamide and the cross-linking agent is N,N'-methylene-bis-acrylamide, N,N'-methylene-bis-methacrylamide and other lower alkylidene-bis-acrylamides wherein the alkylidene group has up to 4 carbons.

8. A viscous, short aqueous composition comprising an aqueous medium having dispersed therein from about 0.1 to about 2 percent by weight of microbeads of a water-insoluble, water-swellable polymer of a water-soluble vinyl monomer or mixture of water-soluble vinyl monomers, cross-linked with a difunctional cross-linking agent copolymerizable with said monomer or monomers, said microbeads having diameters of from about 0.2 to about 4 microns and having a gel capacity of at least about 10 grams per gram in aqueous 0.27 molar sodium chloride solution, said polymer being cross-linked with from about 50 to 1000 parts by weight of cross-linking agent per million parts of vinyl monomer or monomers in the polymer.

9. A composition according to claim 8 wherein the polymer is cross-linked with from about 100 to 400 parts by weight of cross-linking agent per million parts of vinyl monomer or monomers in the polymer.

10. A composition according to claim 9 wherein the vinyl monomer consists preponderantly of acrylamide.

11. A composition according to claim 10 wherein the polymer is a copolymer of acrylamide and acrylic acid with the cross-linking agent.

12. A composition according to claim 9 wherein the polymer is a copolymer of acrylamide and sodium acrylate with the cross-linking agent.

13. The composition according to claim 8 wherein the cross-linking agent is divinylbenzenesulfonate, ethylene glycol diacrylate, ethylene glycol dimethacrylate, propylene glycol diacrylate, allyl acrylate, diallyl ethylene glycol ether, divinyl ether, diallyl ether, divinyl ether of ethylene glycol, divinyl ether of diethylene glycol, divinyl ether of triethylene glycol, N,N'-methylene-bis-acrylamide, N,N'-methylene-bis-methacrylamide and other lower alkylidene-bis-acrylamide wherein the alkylidene group has up to 4 carbons.

14. The composition of claim 8 wherein the the vinyl monomer is proponderantly acrylamide and the cross-linking agent is N,N'-methylene-bis-acrylamide, N,N'-methylene-bis-methacrylamide and other lower alkylidene-bis-acrylamides wherein the alkylidene group has up to 4 carbons.

15. An aqueous composition comprising an aqueous medium having dispersed therein microbeads of a water-insoluble water-swellable polymer of a water-soluble vinyl monomer or mixture of water-soluble vinyl monomers, cross-linked with from about 50 to 1000 parts by weight of a difunctional cross-linking agent per million parts of vinyl monomer or monomers in the polymer, said agent being copolymerizable with said monomer or monomers, said microbeads having a gel capacity at least 10 grams per gram in aqueous 0.27 molar sodium chloride solution diameters from about 0.2 to about 4 microns and being present in an amount sufficient to thicken the aqueous medium to a viscous, short aqueous composition.

* * * * *